United States Patent [19]

Nagarajayya et al.

[11] Patent Number: 6,125,402

[45] Date of Patent: Sep. 26, 2000

[54] METHOD AND SYSTEM FOR EXECUTING ONE OF SEVERAL FORMS OF A MULTI-PURPOSE PROGRAM

[75] Inventors: Nagendra Nagarajayya, San Jose; Bangalore Madhuchandra, Milpitas, both of Calif.; Xavier de Saint Girons, Chambourcy, France; Vincent Vandenschrick, Antony, France; Thierry J. Lobel, St. Mande, France; Marc D. Moss, Fremont, Calif.; Fabrice Keller, Plaisir, France

[73] Assignee: Sun Microsystems, Inc., Mountain View, Calif.

[21] Appl. No.: 08/874,461

[22] Filed: Jun. 16, 1997

[51] Int. Cl.[7] .................................................. G06F 13/14
[52] U.S. Cl. ............................................................ 709/304
[58] Field of Search ................................... 709/700, 102, 709/104, 107, 300, 301, 302, 303, 304, 305

[56] References Cited

U.S. PATENT DOCUMENTS

| 5,218,699 | 6/1993 | Brandle et al. | 395/650 |
| 5,619,710 | 4/1997 | Travis, Jr. et al. | 395/800 |
| 5,832,219 | 11/1998 | Pettus | 395/200.33 |

OTHER PUBLICATIONS

The Java Platform, by douglas Kramer, JavaSoft, May 1996.
Inside OLE, 2nd Edition, by Kraig Brockschmidt, Microsoft Press, p. 878, 1995.

Flanagan, David, Java In A Nutshell, 2nd Edition, O'Reilly & Associates, Inc., Sebastapol, CA.

Kadel, Rich, Generic Client–Server Classes, Aug. 15, 1996, Internet:javaworld.com/javaworld.

Cameron, Jamie, JFS, Internet:jcameron@letterboxl.com.

*Primary Examiner*—Majid A. Banankhah
*Attorney, Agent, or Firm*—Beyer & Weaver, LLP

[57] ABSTRACT

Methods, systems, and software for executing a particular form of a multi-purpose program in a distributed computing environment are disclosed. In one embodiment, a multi-purpose program is executed in one of two forms upon a request to invoke the multipurpose program in a distributed computing environment. If the program is invoked for executing in an applet form, one possible form of the multi-purpose program, the system makes dynamic calls to a remotely accessible file library for operation of a specific function of the program. If the program is invoked for executing in an application form, another possible form of the program, the system makes local calls to a locally accessible file library for operation of a specific function of the program. In a preferred embodiment, a startup environment is created and adapted for running any one of the several forms of the multi-purpose program. In another embodiment, the applet form of the multi-purpose program is designed to run in a browser environment and the application form is designed to run outside a browser environment.

17 Claims, 7 Drawing Sheets

METHOD AND SYSTEM FOR EXECUTING ONE OF SEVERAL FORMS OF A MULTI-PURPOSE PROGRAM

BACKGROUND OF THE INVENTION

The present invention relates to transmitting and running computer programs on a computer network. More specifically, the invention provides a framework in which modifications to a program that can be presented in multiple forms need only be made once.

One example of a computer program that may be cast in more than one form, where each form of the program carries out more or less the same function but runs in different contexts or settings, is a program written in the Java programming language. Other examples may be found in computer programs written in languages such as Smalltalk and C++, and the framework and methodology described may be applied to programs written in such languages and to programs in languages that have yet to be fully developed.

However, in using a Java program to illustrate the present invention, it is helpful to provide a detailed background for Java, and how the different forms of the Java program execute in different settings. Generally, Java™ is an object-oriented, platform-independent computer programming language and environment initially designed for writing programs that run over the Internet. Specifically, one of the goals of Java™ was to enable Internet programmers to create more lively and interactive sites on the World Wide Web (the "Web"). The Web is one facet of the Internet that allows entities or individuals to create Web sites where a site is an exclusive "space" accessible through the Internet where, generally speaking, information can be displayed. A Web site is typically contained on a server which transmits data to a client computer running a browser program. A browser is a computer program that provides a user with a window and various controls through which data from a remote server that stores the Web site can be viewed and navigated. Given the explosive growth of the Internet over the past several years, the number of sites on the Web has increased by orders of magnitude over the years, now ranging in the hundreds of thousands. Web sites are now created and used by individuals, families, corporations, government agencies, nonprofit organizations, academic institutions, and associations of all types to provide information to whoever may want it. The vast majority of Web sites are static; that is, they display information (usually text, simple graphics, and occasionally photographs) and do not do much else. They can be updated by the site creator, but typically cannot interact with a user (i.e. a visitor to the Web site).

However, the static nature of Web sites is changing. As early as late 1995 and early 1996, Web site developers have been adding other forms of media such as animation, sound, and video to Web sites. As a result, sites began offering its users moving objects through animation, and sound such as speech or music. Returning to the Java example, one use of Java™ is to enhance the capability of displaying these and other types of media on Web sites and to offer the previously unavailable capability of making Web sites interactive. Java™ also allows a site to provide real-time displays of complex data. A Web site that takes advantage of Java™ can have its users control—to a substantial degree—events that occur in the Web site. Previously, a user could go to different pages in a Web site (a page being simply another section of the site not visible on the screen and that can be linked to using a hypertext command) by clicking on an icon or symbol, or could even establish links to other related Web sites. It was also possible, with some of the more sophisticated sites, to enter information through, for example, a questionnaire. This information could then later be evaluated by the site's creator. With Java™-enhanced sites, users can now be more dynamic and interactive when visiting a site.

For example, suppose a computer graphics software company named C-Graphics, Inc. created a Web site where users can walk through a virtual environment called "CG World," comprised of several levels, so they can learn more about C-Graphics' products and services in an entertaining way. When a user enters the site, the user chooses which level to visit. After choosing a level, a voice comes on giving further details on what can be done on this level. As the user is moving up (or down) to this level, for example, in a glass-wall elevator, the user is able to briefly see and hear, through animation sequences and audio clips, activities taking place while passing the other levels. This sequence gives the user a real-life feeling of movement through a virtual environment. When arriving at the chosen level, the user gets off the elevator and begins walking down a wide corridor or sidewalk with a variety of activity rooms or booths on both sides where various C-Graphics products and services are being demonstrated or displayed. Using the keyboard or pointer device (e.g. a mouse or joystick), the user can enter any one of the booths. The user enters a room where C-Graphics demonstrates the functionality and enhancements of its latest graphics software with accompanying sound. It does this by letting the user play a computer game that vividly demonstrates C-Graphics new graphics software.

CG World is an example of a highly interactive Web site. It uses several different media to convey information to a user in an engaging and entertaining way, as through the computer game. A Web site is created by writing a program in a Web page description language, such as Hypertext Markup Language (HTML). A Web site can be made multimedia and highly interactive by inserting Java™ programs called applets into HTML code (the HTML code actually contains tags to Java™ applets and may also receive parameter values for the applets and pass them on to the applets through the Web browser). The HTML code is contained in an HTML document. CG World would probably have several applet calls for each animation and sound sequence and separate applet calls for processing input by the user. There is also very likely one applet for each computer game from which the user could choose. These applet tags are embedded in the HTML document which creates the static background (graphics, text, etc.) in the Web site, and may provide the setting for the multimedia and interactive components to run.

A user accesses a Web site through a browser which resides on the user's computer, also referred to as the client machine. A browser is a program that seeks, downloads, and displays Web sites and also executes any programs needed for the operation of that Web site. Thus, a user brings up the browser on the client machine and downloads the C-Graphics Web site CG World. When the user begins walking through the Web site, the browser begins running Java™ applets. The browser must be equipped with a Java™ Virtual Machine (VM) which allows the browser to interpret Java™ applets. Browsers so equipped are considered Java™- enabled and can take advantage of Java™-enhanced Web sites. Examples of such browsers are Hot Java™ available from Sun Microsystems of Sunnyvale, Calif., Netscape Navigator 3.0 available from Netscape Communications of Menlo Park, Calif., and Internet Explorer 4.0 available from Microsoft Corporation of Redmond, Wash.

It should be noted that other languages can have different forms of a program that performs the same function, and that the present invention can be used in programming environments other than Java. Thus, using the Java example, it is helpful to keep in mind that an applet program may represent one form of the program and an application program can represent another form of the program with the same function. Continuing with the Java example, an applet does not have a single executable file; it is typically contained within class files or classes. Most Java™ applets are spread across several classes, which may be contained in one or more class libraries. Classes define Java™ program building blocks called objects as well as behavior and attributes of the objects. To run a Java™ applet from a Web site, the site developer inserts tags into the HTML code, or the code of some type of page description language, which instruct the browser to download the appropriate classes from the Web server and then interpret the classes. Specifically, the tag identifies the Javau classes needed for running the applet and may also set parameter values.

In Java there are two forms of a program: applets and applications. Applets, as discussed above, are essentially embedded in HTML documents and are executed by a Java™-enabled browser. A Java™ application is designed to run on a client machine's operating system and is executed by the user. Once it is downloaded onto the client machine, typically from a Web site—but not necessarily so—it can run as a stand-alone application without any connections to the Internet. It is useful to remember that even though Java™ is closely associated with Web sites and browsers, it is a robust, independent, and fully functional programming language and applications written in Java™ are capable of running on stand-alone computers. Java™ applications can be run, like a spreadsheet or word processing application, without any association or connection to the Internet. A Java™ application is also comprised of classes which make up one or more class libraries. All the classes needed by the application are available on the client machine, whereas with an applet the browser may have to make calls to the Web server (described below) over the Internet for classes as they are needed The same function can be performed by different forms of the same program written in a particular language, such as an applet program and an application program. For example, the computer game chosen by the user in CG World so she can see a demonstration of C-Graphics' software can be cast as an applet or an application. In this example, the program executed in CG World was a Java™ applet because it was executed by and run on the browser. The classes needed to run the game were dynamically called from the Web server as they were needed. The computer game can also be programmed as a Java™ application. It should be noted that some functions performed by Java™ programs, or programs in another language, while originally intended to run in a particular context, such as in a Web site, can be useful or entertaining functions in their own right. That is, they can have a purpose independent of a particular context. The computer game in CG World, while serving C-Graphics' purpose in promoting its products, may be an entertaining and desirable game to have on one's personal computer to play at anytime, independent of the Web site. Thus, it is useful to have the game as a Java™ application which a user (not browser) can download onto a hard drive and, thereafter, play whenever the user wants to without having to access the Internet. This can also be done for a unique or elaborate animation sequence or audio clip in a Web site which a user may want to download and store on the user's hard drive to run at a later time.

The HTML documents and other files related to a Web generally reside on a server computer known as a Web server. Although Web servers vary greatly in processing speed and memory, they are essentially generic computers with a CPU, co-processors, and memory. FIG. 6 discussed in the specification describes in further detail the components of a computer as used in the described embodiment. The different types of computers that can act as a server are well known to those in the computer field. Larger entities such as corporations or government agencies have their own Web servers that contain their Web sites. These servers are typically on the entity's private network, such as an Intranet, and are dedicated to Internet-related functions and may often be responsible for connecting nodes on the private network to the Internet. They typically have high processing speeds and large amounts of memory.

FIG. 1A is a schematic illustration of an example of a prior art relationship in which a computer program, cast in two forms, one of which is an applet program, carries out the same function but must be updated or modified separately even though the changes to code in both forms are the same. The example is the same as that outlined above using the Java example. The illustrative relationship is between a Web server and a client machine running a browser via the Internet and of the files residing on each computer. A Web server 102 is connected to the Internet 104 via a communication link 106, such as a telephone line and is typically a node on a private network (not shown). Server 102 can be a generic computer or a computer specially configured to act solely as a Web server. Server 102 has a memory storage area 108 containing various files and libraries generally related to the Internet 104 and the Web site 110, among other standard operating system files and programs. HTML document 112 contains HTML code that constructs Web site 110 when executed. HTML document 112 contains a tag that invokes applet file 114 containing Java™ language code. Another type of Javam program is a Java™ stand-alone application 116. The stand-alone application 116 which is not called by HTML document 112 performs the same function as applet 114. Both stand-alone application 116 and applet 114 do not have a single executable file although the code may reside in one or more files. As mentioned above, applets and applications are comprised of classes. These classes 118 are grouped into one or more class libraries 120. Classes 118 define program building components called objects. Memory 108 also contains media files 122 such as image files and audio clips. Finally, memory 108 also contains a user data storage area 124. Area 124 is used to retain data such as default settings, preferences and saved output data of users running applet 114. If applet 114 is interactive and accepts information from the user it may be desirable to save this information for later use by the same user. Storage area 124 is generally useful only when a user shares information and interacts with the Web site running an applet. For example, in the CG World Web site, the user playing the computer game may want to keep preferred game settings, scores, or tags indicating where she left off the last time she played, so that the next time she runs the applet this information will be available. Communication medium 126 connects client machine 128 with the Internet 104. Client machine 128 can be any type of general purpose computer with a monitor 130 and memory. Client machine 128 may also be a node on a private network with access to the Internet via an Internet server similar to server 102. A user can access a Web site 110 through a browser 134. If the Web site is Java™ enhanced such as site 110 contained on server 108 the user must have a Java™ enabled Web browser 134 to take advantage of imbedded Java™ applets. Client machine 128 installed with a Java™-enabled browser has downloaded Web site 110 and is running applet 114. Memory 132 contains HTML document 112 and a subset 136 of classes 118.

Classes 136 are needed to begin running applet 114. If other classes are needed from class library 120, they are called dynamically as they are needed. Also contained on memory 132 is applet code 114 which is downloaded from server 102 by browser 134. Media files 122 are also downloaded onto memory 132 if they are needed by applet 144.

FIG. 1B is a schematic illustration of an example of a prior art relationship in which a computer program, cast in two forms, one of which is an application program, carries out the same function but must be updated or modified separately even though the changes to code in both forms are the same. The illustration is the same as the example outlined. The relationship is between Web server 102 and a client machine 138 running a stand-alone application 116, and the files residing on their respective memory. Web server 102 components and files are the same as those in FIG. 1a. On the client side, client machine 138 is running its local operating system 140, such as the Solaris Operating System available from Sun Microsystems. It is not running a Web browser as in FIG. 1a. Client memory 142 contains stand-alone application code 116 and class library 120 in its entirety. This is necessary because client machine 138 does not make dynamic calls to Web server 102 when running a Java™ stand-alone application 116. The application 116 may have been downloaded previously from a Web site using a browser, but the connection 144 to the Internet is not necessary when running stand-alone application 116. Media files 122 and HTML document 112 are also contained on memory 142. Thus, application 116 has all the components it needs to run without having to make calls to Web server 102. The user executes application 116 which runs on top of the client machine's operating system 140.

As shown in FIGS. 1A and 1B, memory 108 contains two programs: applet 114 and application 116. Both programs perform the same function. Presently, when updates are made to improve the particular function, both programs must be modified. Having to update two programs when changes are required is a time-consuming and error-prone procedure. This is true for computer programs written in most programming languages. Typically, the programmer or programming team must physically open all files containing program code and make the changes. Once this is done, the programs must be tested and debugged. Having to do this with one large program is a time-consuming task in itself; having to make exactly the same changes in two programs can make the task significantly more burdensome and can make the program update process more error-prone. For example, with the growth of Java™-enhanced Web sites, the requirement for dual updates is becoming an increasing problem for Web site owners and developers. In addition, because of time constraints or neglect, different forms of the same program may not be updated by the programmers at the same time (or within an acceptable time period), thus resulting in two versions of the same program over time. It should be kept in mind that presently programmers must go into the code of each version of the program and make the same changes necessary such that the functionality of the programs remains the same. Maintaining program integrity over time is also an essential task of the programmer and a vital component in the development of the computer program over time. In the case of Java™, an applet and application may not be updated at the same time thus resulting in two versions of the same program over time; for example, one running on the Web site and a different one downloaded by users. Keeping track of these updates and maintaining program integrity could easily become a serious problem for the Web site owner and developer. It would be desirable to have a program framework that would permit a single program, cast in more than one form, to behave according to the context in which it is being run. This would eliminate the need for having to physically update—all within an acceptable time period—multiple forms of the same program. For example, it would be desirable to have a program framework that would permit a single program to behave as an applet or stand-alone application depending on whether it is being invoked in a browser or on top of a user machine's operating system

SUMMARY OF THE INVENTION

To achieve the foregoing and other objects, and in accordance with the purpose of the present invention, methods, systems, and software for executing a particular mode of a multi-purpose computer program in a distributed computing environment are disclosed. In one preferred embodiment, a method of executing either an applet form or an application form of a multi-purpose program is disclosed. The program determines if an incoming request for execution is requesting execution in an applet form or in an application form. If the program is invoked by a request for executing in its applet form, the system makes dynamic calls to a remotely accessible file library for retrieving files necessary for operation of a specific function of the program. If the program is invoked by a request for executing in its application form, the system makes local calls to a locally accessible file library for operation of a specific function of the program.

In a preferred embodiment, the system creates either an application or applet startup environment. If a request invokes the application form of the program, a startup environment is created by running a first set of program files from a locally accessible file library. If a request invokes the applet form of the program, a startup environment is created by dynamically calling and running a second set of program files from a remotely accessible file library. In still another embodiment, the applet form of the multi-purpose program is arranged to operate within a browser environment and the application form is arranged to operate outside a browser environment.

In one embodiment, the system accesses a file library containing a plurality of files and additional program files that are not needed by the multi-purpose program when executing. For example, if the multi-purpose program is a Java program that runs by calling a number of class files, the file library accessed by the program may contain many class files not needed by the Java program being executed but are there for use by other Java programs. This is also true for other files such as HTML files and media files. The Java program being invoked, which can be in the form of an applet or an application, may not need certain media files or HTML documents unrelated to the program's functions.

These and other features and advantages of the present invention will be presented in more detail in the following specification of the invention and the figures.

DESCRIPTION OF THE PREFERRED EMBODIMENTS

Figure 1A:
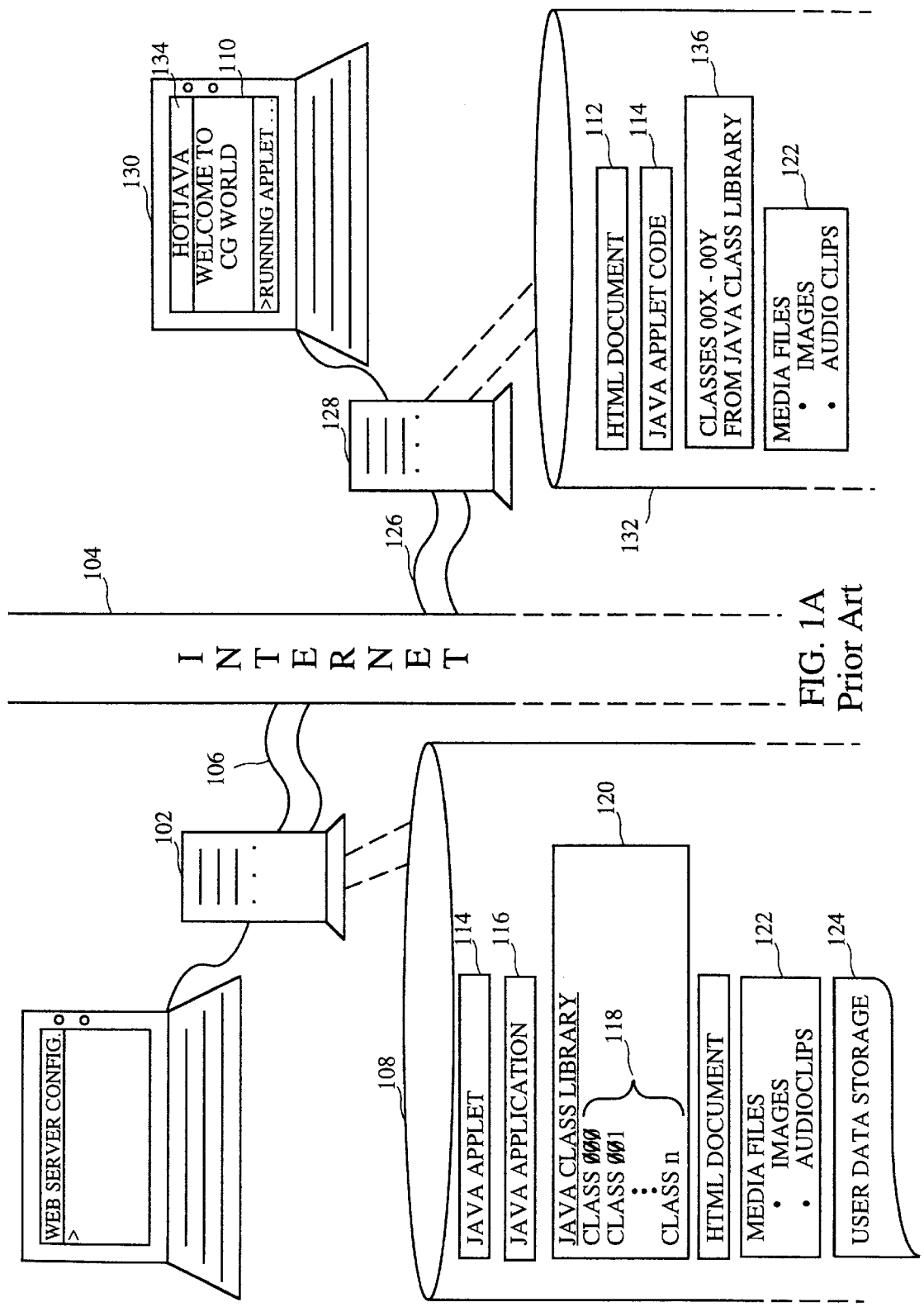
FIG. 1A is a schematic illustration of an example of a prior art relationship in which a computer program, cast in two forms, one of which is an applet program, carries out the same function but must be updated or modified separately even though the changes to code in both forms are the same. The example is based on a Java program cast as a Java applet, shown in FIG. 1A, and a Java application (shown in FIG. 1B).
Figure 1B:
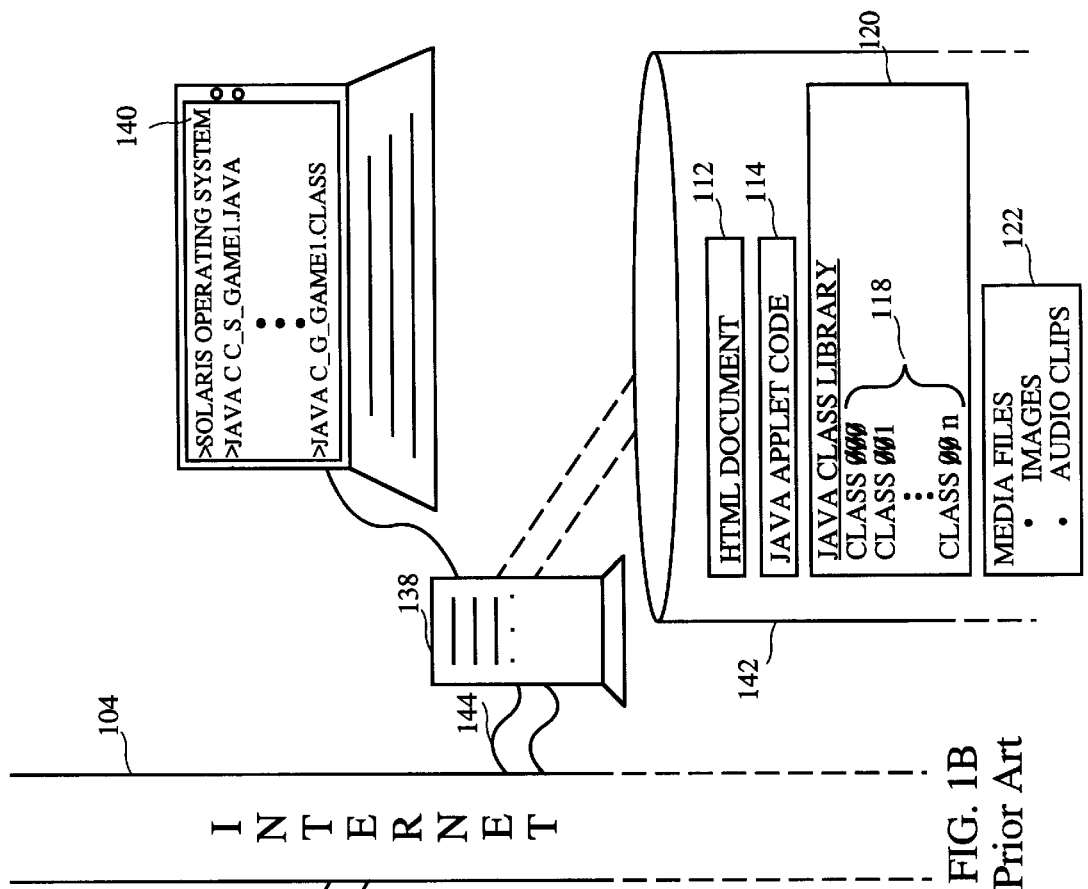
FIG. 1B is a schematic illustration of an example of a prior art relationship in which a computer program, cast in two forms, one of which is an application program, carries out the same function but must be updated or modified separately even though the changes to code in both forms are the same. The example is based on a Java program cast as a Java application, shown in FIG. 1B, and a Java applet (shown in FIG. 1A).
Figure 1B:
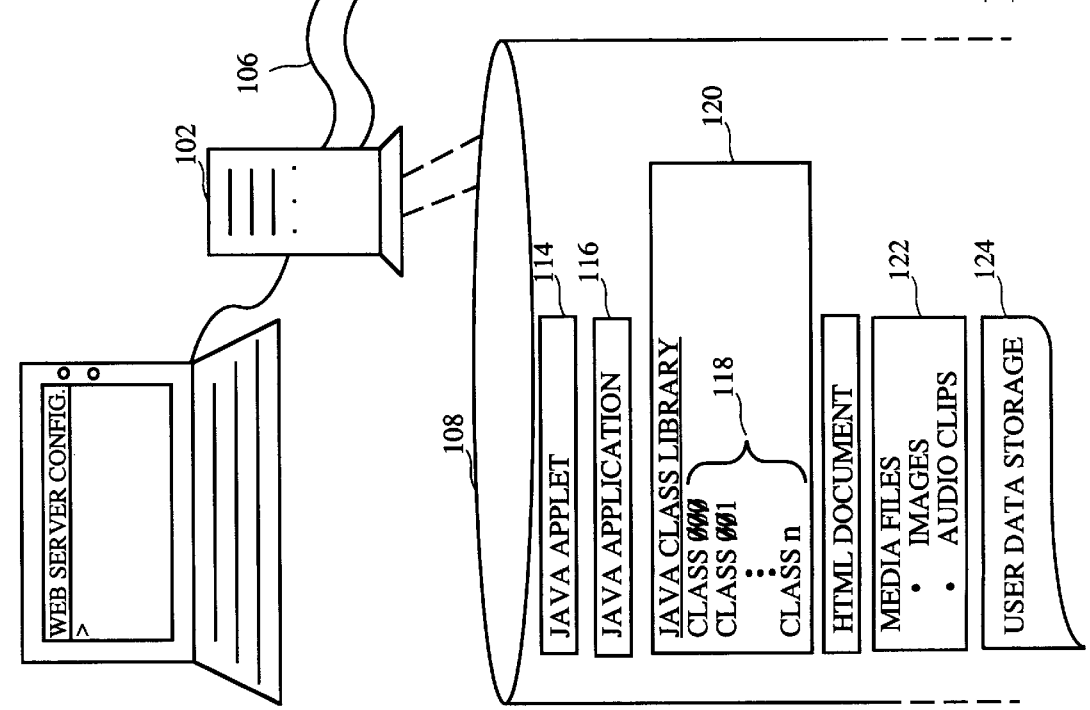
Figure 2:
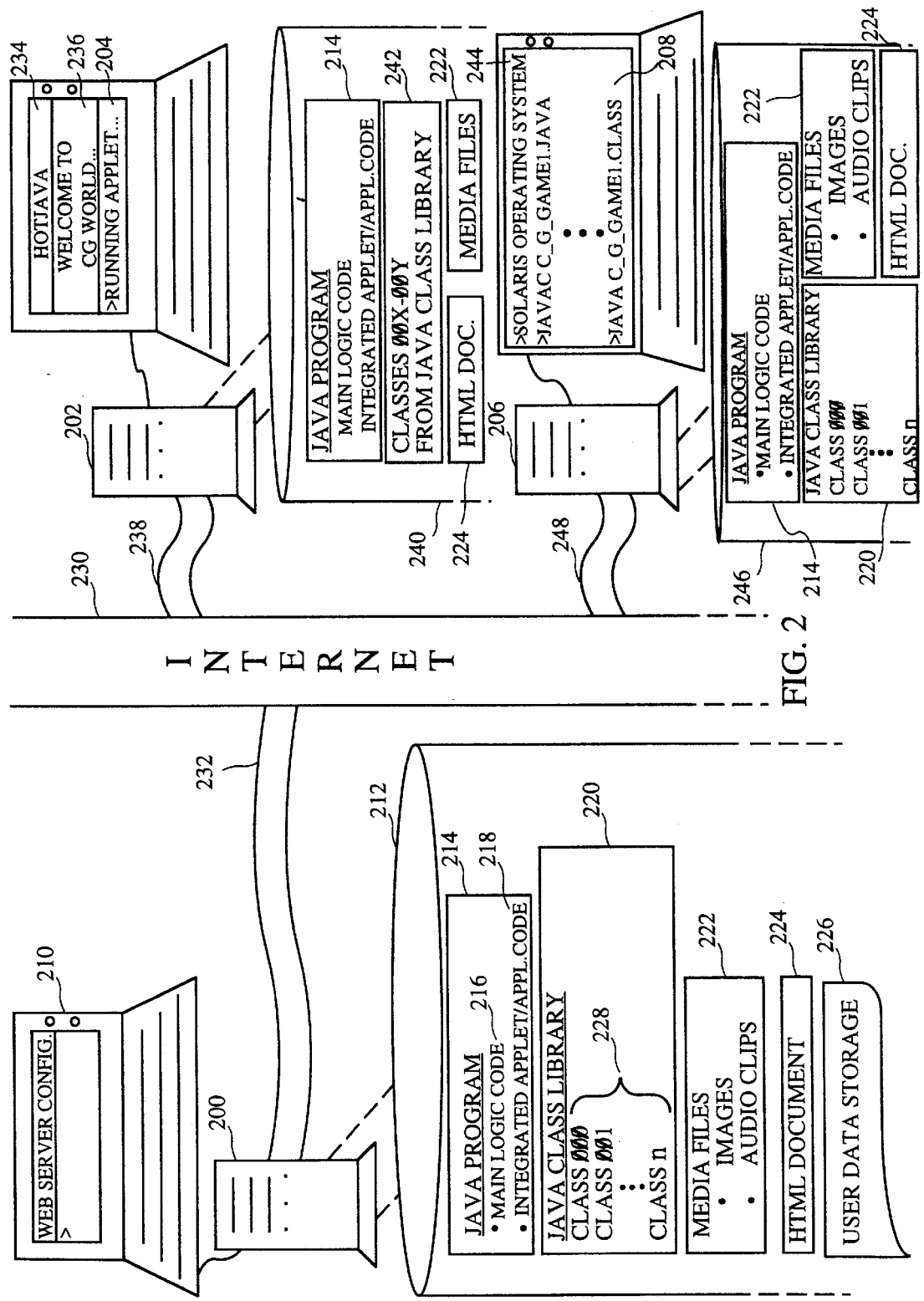
FIG. 2 is a schematic illustration of the described embodiment of the present invention showing a Web server, a first client machine running an applet program, and a second client machine running an application program.

FIG. 2 is a schematic illustration of the described embodiment of the present invention showing a Web server 200, a first client machine 202 running an applet program 204 from server 200, and a second client machine 206 running an application program 208 copied from server 200. Specifically, it shows the files residing on each computer. Web server 200 has the same role as server 102 in FIGS. 1A and 1B. Generally, it is a computer configured to handle Internet-related services for a network or can be a stand-alone computer not connected to a private network. Server 200 has a display monitor 210 as an output device for the network administrators. Server memory 212 contains a program framework 214 that can function as an applet or an application. Program code 218 that performs the desired function is preceded by main logic code 216 that directs what will be downloaded to the client machine. A flowchart of the logic in code 216 is shown in further detail in FIG. 3. Following main logic code 216 is program 218 that is an integration of applet (e.g. 114 of FIG. 1A) and application code (e.g. 116 of FIG. 1A). Memory 212 also contains class library 220 and other non-essential files (their need depending on the program's function) such as media files 222, HTML document 224, and a user storage area 226. Class library 220 contains classes or class files 228. Server 200 is connected to the computer network 230 via communication link 232.

First client machine 202 is running a Java™-enabled browser 234 which has downloaded a Web site 236 as defined by HTML document 224 and frame 214. In the described embodiment browser 234 is the Hot Java™ browser available from Sun Microsystems of Mountain View, Calif. Frame 214 is downloaded onto client machine 202, allowing it to run applet programs, as formed by integrated program 218 and classes 228, as needed based on the user's actions in Web site 236. This scenario is identical to the user who enters the CG World Web site and decides to play a computer game thereby invoking a Java™ applet. Client machine 202 is connected to the network 230 via a communication link 238. Client machine 202 has a memory 240 which contains a subset 242 of classes 228 downloaded from class library 220. Other classes are called from library 220 on server memory 212 as they are needed. For example, the user's decision in the CG World Web site to play the computer game very likely required dynamic calls to the server for additional classes comprising the computer game applet. Media files 222 and HTML document 224 are also downloaded onto client memory 240.

Second client machine 206 is executing an application program 208 on top of client machine's operating system 244. The application program can run on top of any suitable operating system. In the described embodiment the operating system is the Solaris operating system available from Sun Microsystems of Menlo Park, Calif. Second client machine's memory 246 contains frame 214 and class library 220. It also contains media files 222 and HTML document 224. In the described embodiment, all Java™ files were downloaded onto memory 246 previously using a browser. It is also possible to copy these files from a disk made from copying files directly off of server memory 212. If this method is used, client machine 206 would not need communication link 248 with the computer network 230. All files, class libraries, and executable code needed to run application program 208 are contained on client machine 206.

Figure 3:
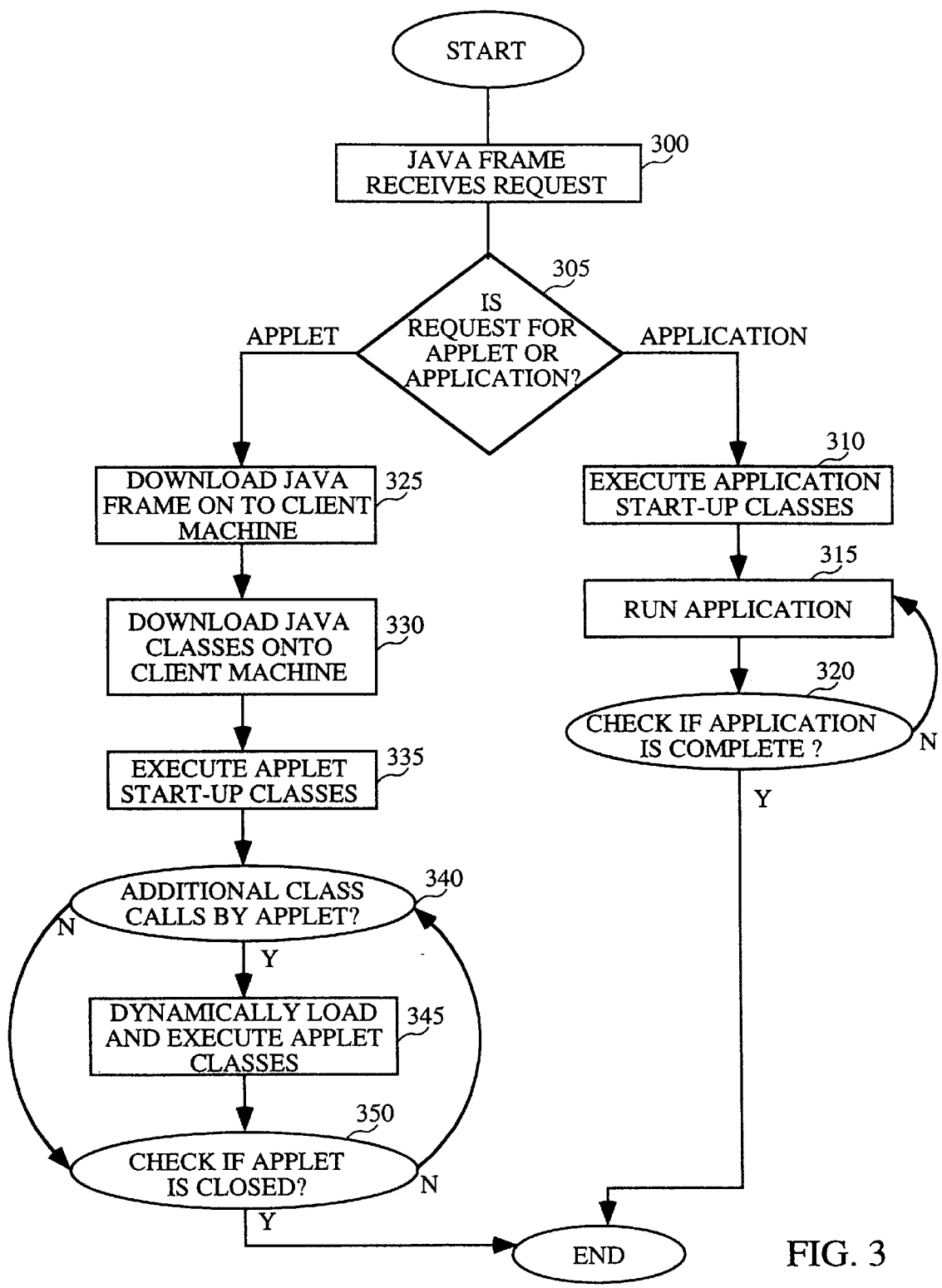
FIG. 3 is a flowchart showing steps taken by the main logic code in a program that determines whether integrated applet/application code should behave as an applet or an application in accordance with one embodiment of the present invention.

FIG. 3 is a flowchart showing steps taken by main logic code 216 in program 214 of FIG. 2 that determines whether code 216 should behave as an applet program or an application program. In step 300, program 214 receives a request initiated by a user action. For example, the user's action of choosing a particular level in CG World invoked at least two requests to the Java™ frame: one for an animation sequence and another for the voice telling the user more about the chosen level. Program 214 determines whether the request is for an applet program or an application program in step 305. Following the CG World example, the user's actions are manifested as requests to a Java™ program. If the request is for an application program, control passes to step 310. This would be the case if the user had downloaded the computer game from the CG World Web site and wanted to keep the game on the user's hard drive to play at a later time. In this step, start-up classes from class library 220 for creating a start up environment for the application to run are executed. If the request is for an application program, the program 214 executes classes for establishing the startup environment for the application program in step 315. Execution of the applet program startup classes is shown in further detail in FIG. 4. The application is then run on the client machine in step 315 using classes and files shown on memory 246 of FIG. 2. In step 320, the program checks if the application is complete or whether the user has exited the application. For example, the computer game application taken from the CG World Web site may have an end-of-game point (e.g. a maximum score or completion of a final event) that would close the application when reached. The program then completes its control over the execution of the application.

Returning to step 305, if the request is for an applet program, control passes to step 325. In step 325, program 214 is downloaded on to the client (user) machine. This is shown in FIG. 2 as object 214 on memory 240. In step 330, the browser downloads a subset of classes, object 242 in FIG. 2, from the class library 220. Also downloaded on the client machine are the HTML document 224 and any media files 222 needed by the applet program. The HTML document and media files may already have been downloaded onto the client machine because the user is already in the Web site when the applet program is invoked. It is noted that when a request for an application program is made, the media files and the program are already residing on the client machine's memory having been downloaded or copied there previously. Thus, steps 325 and 330 are not present in the application program execution logic (starting with step 310). Returning to the CG World example, when the user enters the booth where the user can chose to play the computer game, the browser has already downloaded the Web site onto the client machine, but will call the program and classes making up the computer game applet when the user chooses to play the computer game.

In step 335, the applet startup classes are executed creating the environment for the program to run, similar to the actions taken in step 310. It is noted, however, that the applet startup classes are not necessarily the same as the application startup classes and the two subsets of classes may in fact be mutually exclusive. The startup classes are part of the subset of classes taken from the class library and downloaded on the client machine in step 330. In step 340, the program determines if the applet needs other classes to run that are not available in the subset of classes downloaded in step 330. This can happen when, for example with Java applets, the nature of the applet is more interactive and can accept input from the user, and is less likely to occur with functions that have a well-defined ending and do not accept any user input, such as programs that output animation or sound sequences. With these types of functions, all the necessary classes are included in the subset of classes (object 242 of FIG. 2). However, with more elaborate interactive functions, such as the computer game in CG World, additional classes might be needed for the function to continue beyond a certain point.

If more classes are needed by the applet, they are dynamically loaded from the class libraries on the Web server and executed on the client machine as shown in step 345. Thus, the client machine's connection to the computer network must be maintained during the applet's operation. If additional files are not needed, the program checks if the applet has been closed by the user as shown in step 350. As with applications, this could happen when the applet function itself comes to an end or when the user decides to exit the function. In the case of the computer game applet, the user can stop playing the game and continue exploring the rest of CG World, invoking other applets (represented by other programs, classes, and media files) as the user moves around.

Figure 4:
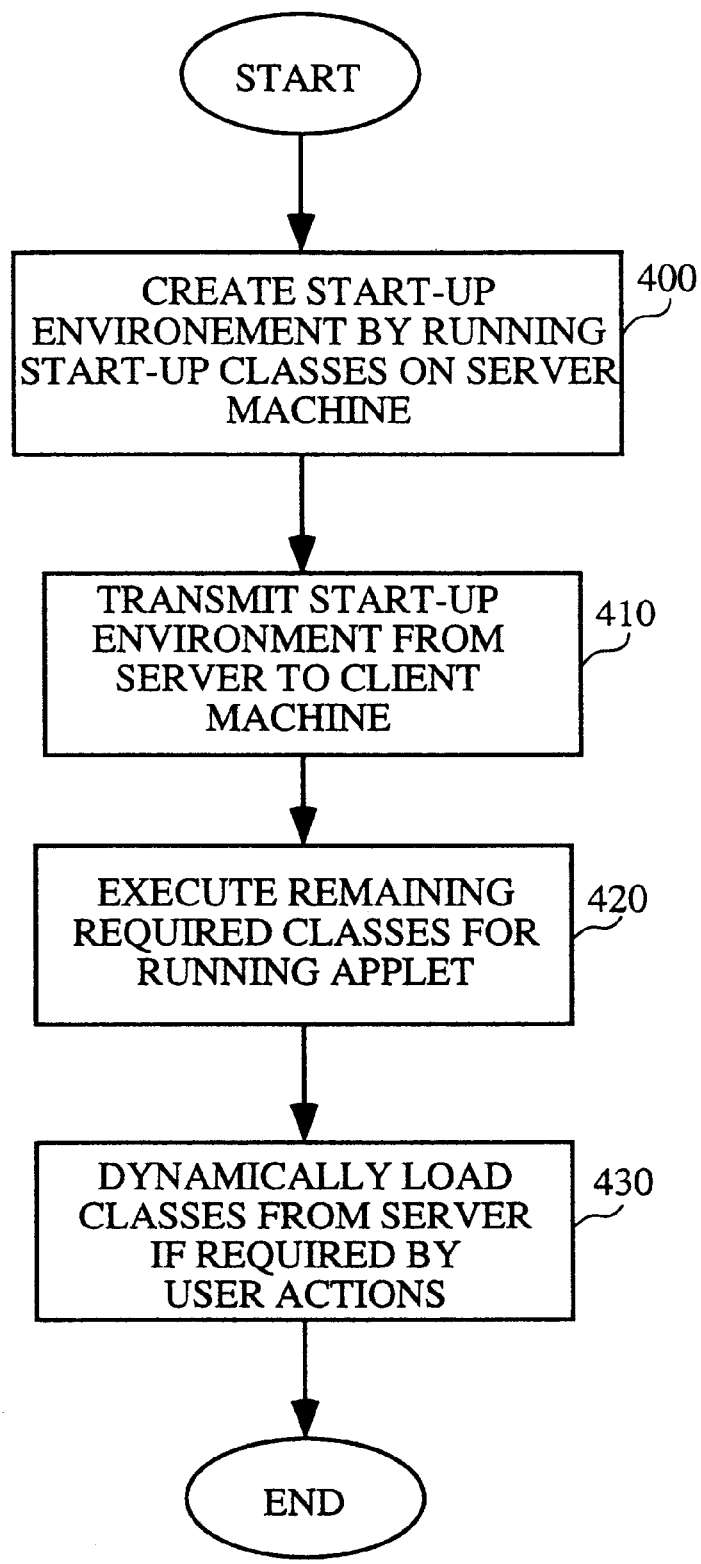
FIG. 4 is a flowchart showing the execution of applet startup classes for an applet program running in a Web browser as shown in step 335 of FIG. 3 in further detail.

FIG. 4 is a flowchart showing the execution of applet startup classes for an applet program running in a Web browser as shown in step 335 of FIG. 3 in further detail. In step 400 the startup environment is created by running the applet start up classes on the server machine. This step is incorporated in step 330 in FIG. 3 where a subset of classes is downloaded onto the client machine when the applet is initially invoked. Once the startup environment is transmitted to and run on the client machine in step 410, the browser is ready to execute the remaining required applet startup classes. In the described embodiment, the startup environment is created on the server computer and is transmitted to the client. In another embodiment of the present invention, the Web server may already have stored a particular user's startup environment (as an enhanced feature for frequent users) and will only have to run the startup class files once when the user invokes the applet for the first time. This startup information may be stored in the user data storage area 226 of memory 212 of FIG. 2. Once the startup environment is in place, in step 420 the browser executes non-startup classes that are required or mandatory for running the applet program. These classes are also included in the subset of classes taken from class libraries on the Web server. In step 430 the browser dynamically loads classes from class libraries on the Web server memory if user actions or input require additional classes. For example, if the user in CG World reached an unusually high level or score in the computer game, the applet may require additional classes to continue running. These "calls" are made dynamically over the network to the server while the user is playing the computer game. The browser continues running the applet program and dynamically loading classes as needed until the applet program is closed.

Figure 5:
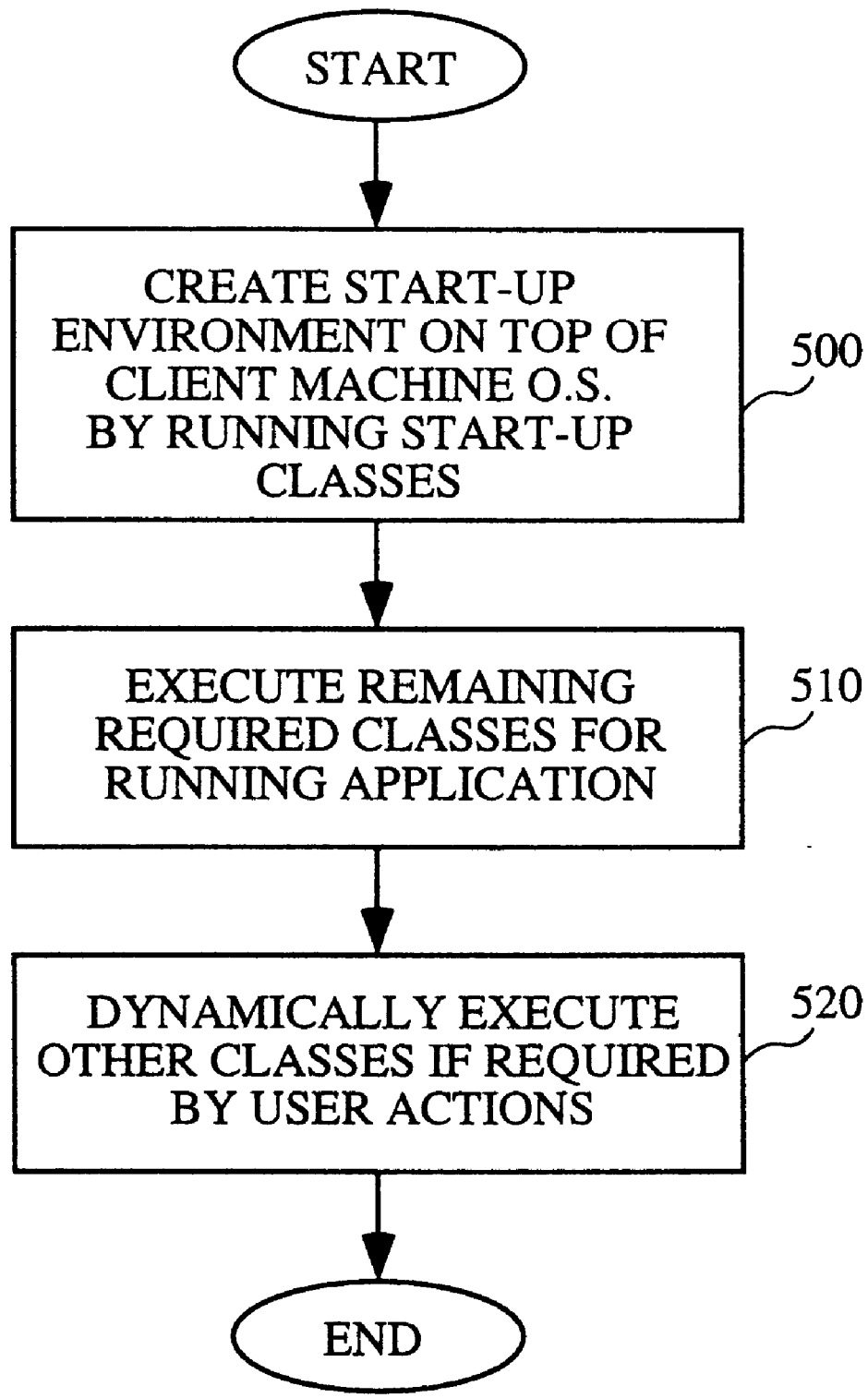
FIG. 5 is a flowchart showing the execution of startup classes for an application program as shown in step 310 of FIG. 3 in further detail.

FIG. 5 is a flowchart showing in further detail step 310 of FIG. 3 of executing the startup classes for an application program. In step 500, the program executes the application startup classes from the class library 220 of FIG. 2 on top of the client machine's operating system. Once the start-up environment is created in step 500, the remaining non-startup classes are executed in step 510, similar to step 420 of FIG. 4. If other classes are needed, they are executed dynamically as the application is running without having to access the computer network given that the entire class library resides on the client machine. The application continues running and dynamically executing classes as needed by the application until the application is closed.

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should remembered, however, that all of these and similar terms are to be associated with the appropriate physical quantities and are merely convenient labels applied to these quantities.

Further, the manipulations performed are often referred to in terms, such as identifying, running, executing, downloading, or detecting. In any of the operations described herein that form part of the present invention, these operations are machine operations. Useful machines for performing the operations of the present invention include general purpose digital computers or other similar devices. In all cases, it should be borne in mind the distinction between the method of operations in operating a computer and the method of computation itself. The present invention relates to method steps for operating a computer in processing electrical or other physical signals to generate other desired physical signals.

The present invention also relates to a computer system for performing these operations. This computer system may be specially constructed for the required purposes, or it may be a general purpose computer selectively activated or reconfigured by a computer program stored in the computer. The processes presented herein are not inherently related to any particular computer or other computing apparatus. In particular, various general purpose computing machines may be used with programs written in accordance with the teachings herein, or it may be more convenient to construct a more specialized computer apparatus to perform the required method steps.

Figure 6:
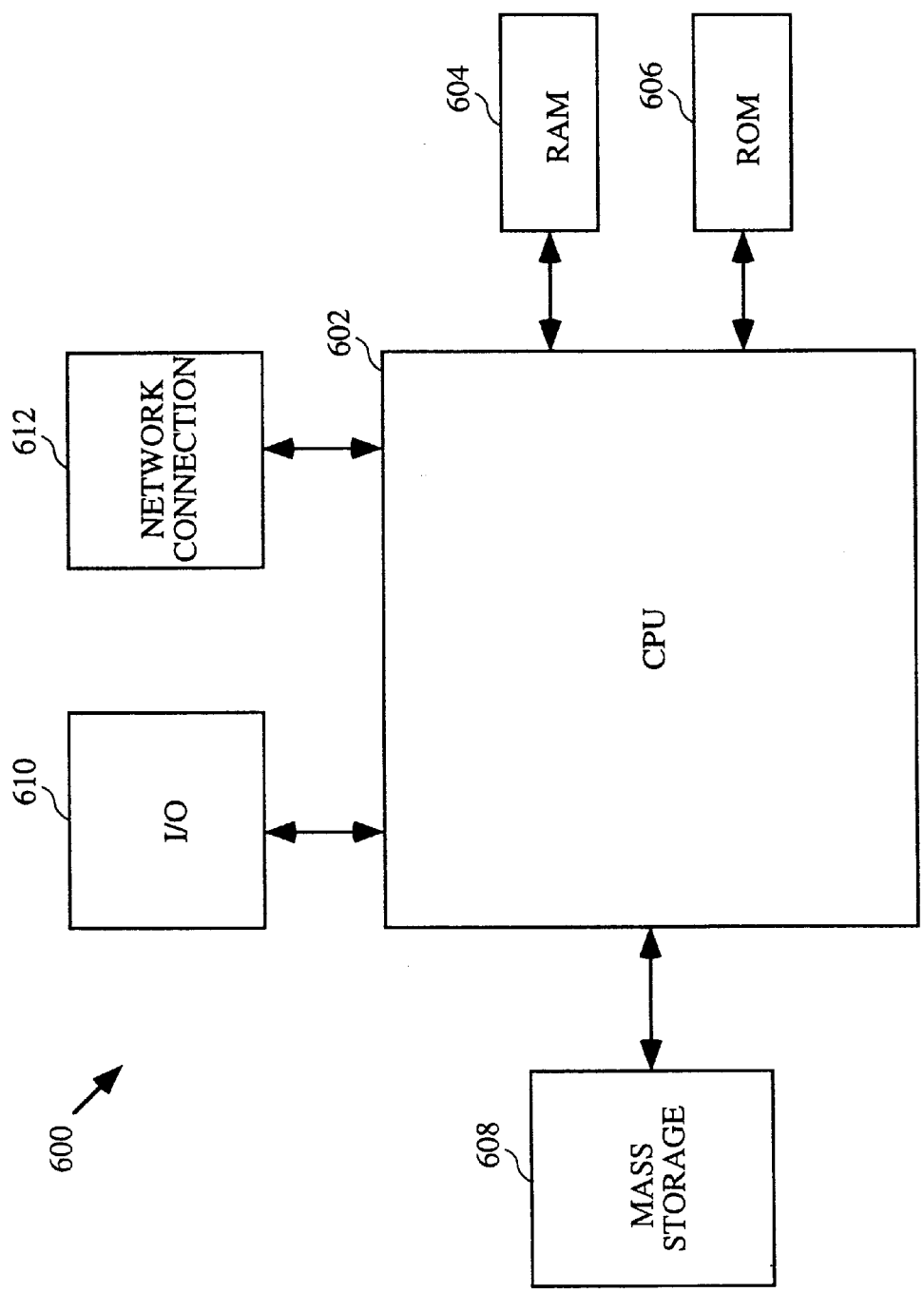
FIG. 6 is a schematic illustration of a general purpose computer system suitable for implementing the present invention.

FIG. 6 is a schematic illustration of a general purpose computer system suitable for implementing the present invention. The computer system includes a central processing unit (CPU) 602, which CPU is coupled bidirectionally with random access memory (RAM) 604 and unidirectionally with read only memory (ROM) 606. Typically RAM 604 includes programming instructions and data, including text objects as described herein in addition to other data and instructions for processes currently operating on CPU 602. ROM 606 typically includes basic operating instructions, data and objects used by the computer to perform its functions. In addition, a mass storage device 608, such as a hard disk, CD ROM, magneto-optical (floptical) drive, tape drive or the like, is coupled bidirectionally with CPU 602. Mass storage device 608 generally includes additional programming instructions, data and text objects that typically are not in active use by the CPU, although the address space may be accessed by the CPU, e.g., for virtual memory or the like. Each of the above described computers further includes an input/output source 610 that typically includes input media such as a keyboard, pointer devices (e.g., a mouse or stylus) and the like. Each computer can also include a network connection 612 over which data, including, for example, objects, files, and instructions, can be transferred. Additional mass storage devices (not shown) may also be connected to CPU 602 through network connection 612. It will be appreciated by those skilled in the art that the above described hardware and software elements are of standard design and construction.

Although only a few embodiments of the present invention have been described, it should be understood that the present invention may be embodied in many other specific forms without departing from the spirit or the scope of the present invention. Thus, the program code that performs the main function need not be separate from the main logic code that determines whether to execute an applet or application; the two programs can be combined in one program without departing from the spirit or scope of the present invention. In addition, although the different forms of the program are referred to as applet and application, borrowing teminology from the Java program environment, the system and method of the present invention is not limited to the Java programing environment and can be used with any suitable programming language and environment. Along the same line, the use of the term classes—taken from object-oriented programming—is not intended to limit the spirit or scope of the present invention to object-oriented languages. Therefore, the described embodiments should be taken as illustrative and not restrictive, and the invention should be defined by the following claims and their full scope of equivalents.

What is claimed is:

1. In a program-invocation system that includes a multi-purpose program and a plurality of files, a method of executing the multi-purpose program in either an applet mode or an application mode, such that the same change in behavior in the applet mode and in the application mode is caused by making an update to the multi-purpose program, the method comprising:

receiving an invocation directed to a multi-purpose program wherein the invocation is examined by the multi-purpose program;

determining whether the invocation is intended to invoke an applet mode of the multi-purpose program or an application mode of the multi-purpose program, wherein the multipurpose program includes an integration of applet mode code and application mode code;

executing the multi-purpose program in the applet mode when it is determined that the invocation is intended to invoke an applet mode, wherein when the multi-purpose program is executed in the applet mode, dynamic calls are made to facilitate operation of the multi-purpose program to accomplish a designated function; and executing the multi-purpose program in the application mode when it is determined that the invocation is intended to invoke an application mode, wherein when the multi-purpose program is executed in the application mode, local calls are made to facilitate operation of the multi-purpose program to accomplish the designated function.

2. A method as recited in claim 1 further including:

creating an application startup environment by invoking a first plurality of program files from a local file library; and creating an applet startup environment by dynamically invoking a second plurality of program files from a remote file library.

3. A method as recited in claim 1 further including:

arranging the applet form of the multi-purpose program to operate within a browser environment.

4. A method as recited in claim 1 further including:

arranging the application form of the multi-purpose program to operate outside a browser environment.

5. A method as recited in claim 1 further including:

accessing a file library containing a plurality of files and additional program files that are not needed by the multi-purpose program.

6. A multi-purpose program residing on a computer-readable medium suitable for use in a computer, comprising:

a main logic component responsive to invocations directed to a multi-purpose program, the main logic component being arranged to determine whether received invocations of the multi-purpose program intend to invoke an applet form of the multi-purpose program or an application form of the multi-purpose program, wherein the multipurpose program includes an integration of applet form code and application form code; and an integrated component capable of executing in either the applet form or the application form of the multi-purpose program, the integrated component being arranged to invoke local program files available from a local file library during execution of the multi-purpose program in the application form, and arranged to dynamically invoke remote program files available from a remote file library during execution of the multi-purpose program in the applet form.

7. A multi-purpose program as recited in claim 6 wherein the integrated component is further arranged to:

create an application startup environment in response to invocations intended to invoke the application form of the multi-purpose program by executing a first plurality of program files from a local file library; and create an applet startup environment in response to invocations intended to invoke the applet form of the multi-purpose program by dynamically executing a second plurality of program files from a remote file library.

8. A multi-purpose program as recited in claim 6 wherein the applet form of the multi-purpose program is arranged to operate within a browser environment.

9. A multi-purpose program as recited in claim 6 wherein the application form of the multi-purpose program is arranged to operate outside a browser environment.

10. A multi-purpose program as recited in claim 6 wherein the main logic component and the integrated component are further arranged such that a modification to the multi-purpose program effectuates the same change in behavior in the applet form of the multi-purpose program and in the application form of the multi-purpose program.

11. A multi-purpose program as recited in claim 6 wherein the remote program files are called dynamically over a computer network when requested by the multi-purpose program.

12. A computer-readable program product embodied in a computer-readable medium comprising:

a multi-purpose program as recited in claim 6; and a file library that contains a plurality of files and additional program files that are not needed by the multi-purpose program.

13. In a computer network system that includes a first computer and a second computer connected by a communications medium, a method of executing a multi-purpose program in either a first mode or a second mode on the first computer, the method comprising:

sending from a first computer to a second computer an invocation request for executing a multi-purpose program in either a first mode or a second mode;

determining whether the invocation requests the first mode of the multi-purpose program or the second mode of the multi-purpose program, wherein the multipurpose program includes an integration of first mode code and second mode code;

when it is determined that the invocation requests the first mode of the multi-purpose program, dynamically transmitting a plurality of files from a remote file library over a communications medium from the second computer to the first computer; and when it is determined that the invocation requests the second mode of the multi-purpose program, transferring all files in the remote file library required for executing all features of the second mode of the multi-purpose program to the first computer.

14. A method as recited in claim 13 further including:

creating a startup environment for the first mode in response to an invocation request for executing the first mode of the multi-purpose program by dynamically invoking a first plurality of program files from the remote file library; and creating a startup environment for the second mode in response to an invocation request for executing the second mode of the multi-purpose program by invoking a second plurality of program files from a local file library.

15. A method as recited in claim 13 further including:

arranging the first mode of the multi-purpose program to operate within a browser environment.

16. A method as recited in claim 13 further including:

arranging the second mode of the multi-purpose program to operate outside a browser environment.

17. A method as recited in claim 13 further including:

arranging the remote file library such that the file library contains files that are needed for executing the first mode of the multi-purpose program and contains files that are not needed for executing either the first mode of the multi-purpose program or the second mode of the multi-purpose program.

* * * * *